D. Harvey,
Portable Fence,

No. 47,203. Patented Apr. 11, 1865.

Witnesses.
James A. Throop
J. K. Clark

Inventor.
Davis Harvey

UNITED STATES PATENT OFFICE.

DAVIS HARVEY, OF JACKSON, HENRY COUNTY, IOWA.

IMPROVED FENCE.

Specification forming part of Letters Patent No. 47,203, dated April 11, 1865.

*To all whom it may concern:*

Be it known that I, DAVIS HARVEY, of the township of Jackson, county of Henry, and State of Iowa, have invented a new and Improved Portable Fence; and I do hereby declare that the following is a full, clear, and exact description of the same, reference being had to the annexed drawings, making a part of this specification.

The nature of my invention consists in placing upon the top of any ordinary fence a narrow panel or broad board, projecting outward and upward at a proper angle, which I find to be somewhere near forty-five degrees, far enough to prevent dogs and wolves from scaling or surmounting it, to be used for the purpose of inclosing sheep and protecting them from the ravages of those animals. The manner in which it accomplishes this result is, that the animal, in attempting to jump the fence, catches his fore feet upon this projecting panel, and the fence being so far under, it cannot catch its hind feet, and so falls back upon the same side. This projecting panel is attached to the main fence in any durable manner, permanently or so as to be removed.

Figure 1:
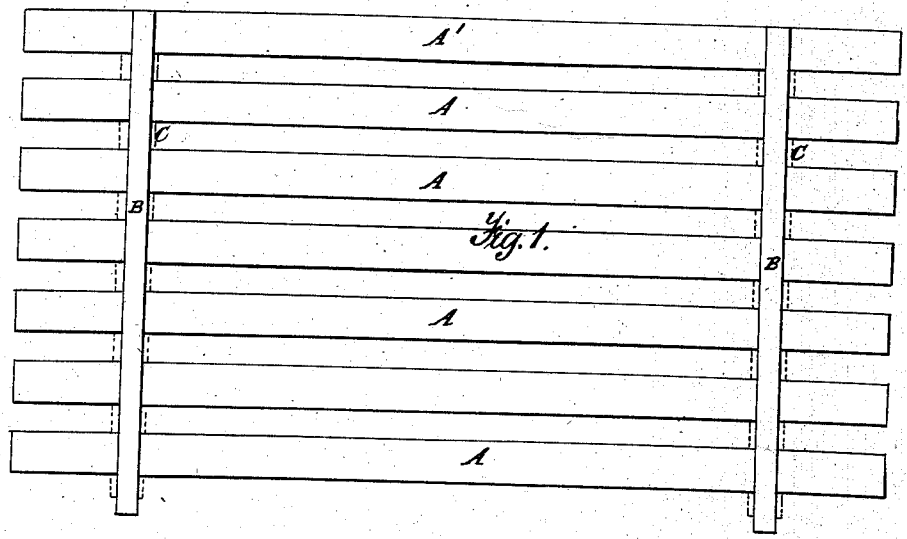
Figure 2:
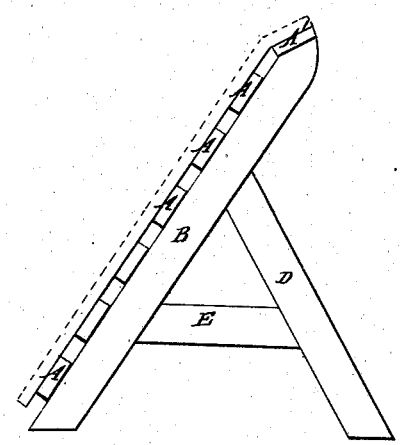

The better to illustrate my invention, I have made drawings, in which Figure 1 is a front view of a section of the fence. A A A A A A represent a panel of ordinary board fence, and A' a panel of the projecting attachment. Fig. 2 is a side view, in which B represents a post of a common fence, to be perpendicular or sloping, and A' the projecting board or panel, to be extended in the direction shown at A' as far as required.

What I claim as new, and desire to secure by Letters Patent, is—

Placing upon any common fence a panel or board projecting outward and upward, for the purpose of preventing dogs and wolves from getting to sheep.

DAVIS HARVEY.

Witnesses:
JAMES A. SHROOP,
J. R. GILCHRIST.